May 25, 1943.　　G. A. COLLENDER　　2,319,978
ROAD VEHICLE MOUNTING
Filed Sept. 30, 1940　　3 Sheets-Sheet 3
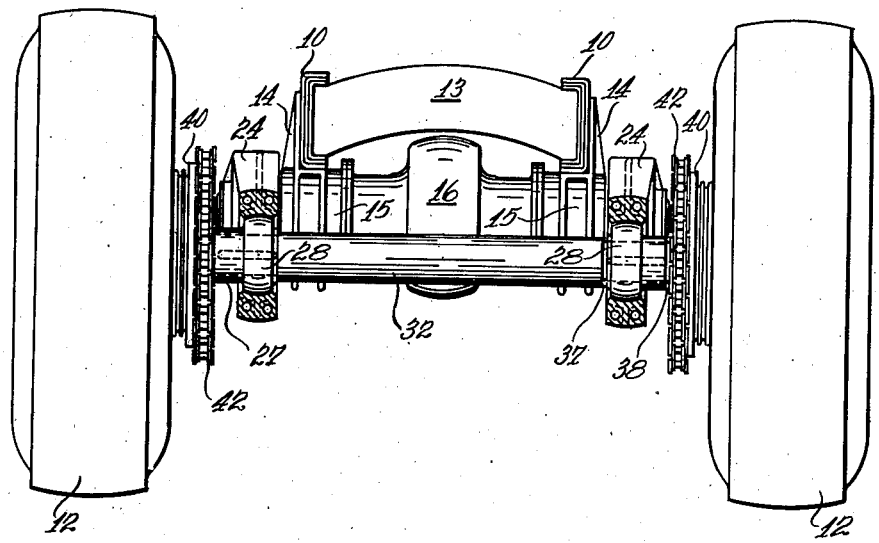
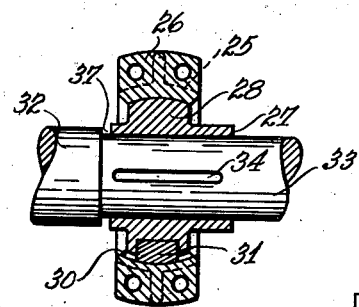
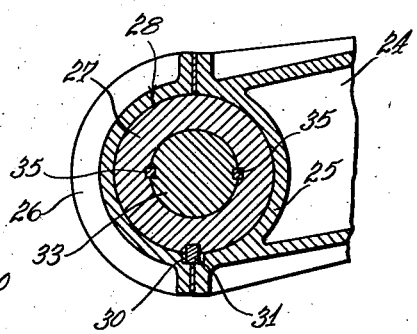
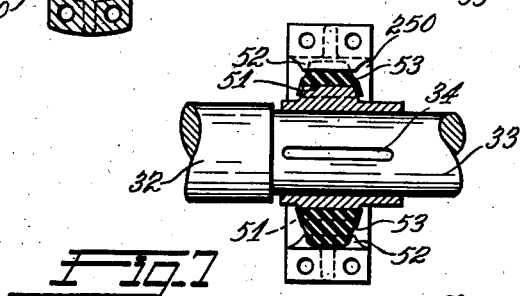
Inventor
Gustave A. Collender
By Ralph L. Stevens
Attorney Patented May 25, 1943

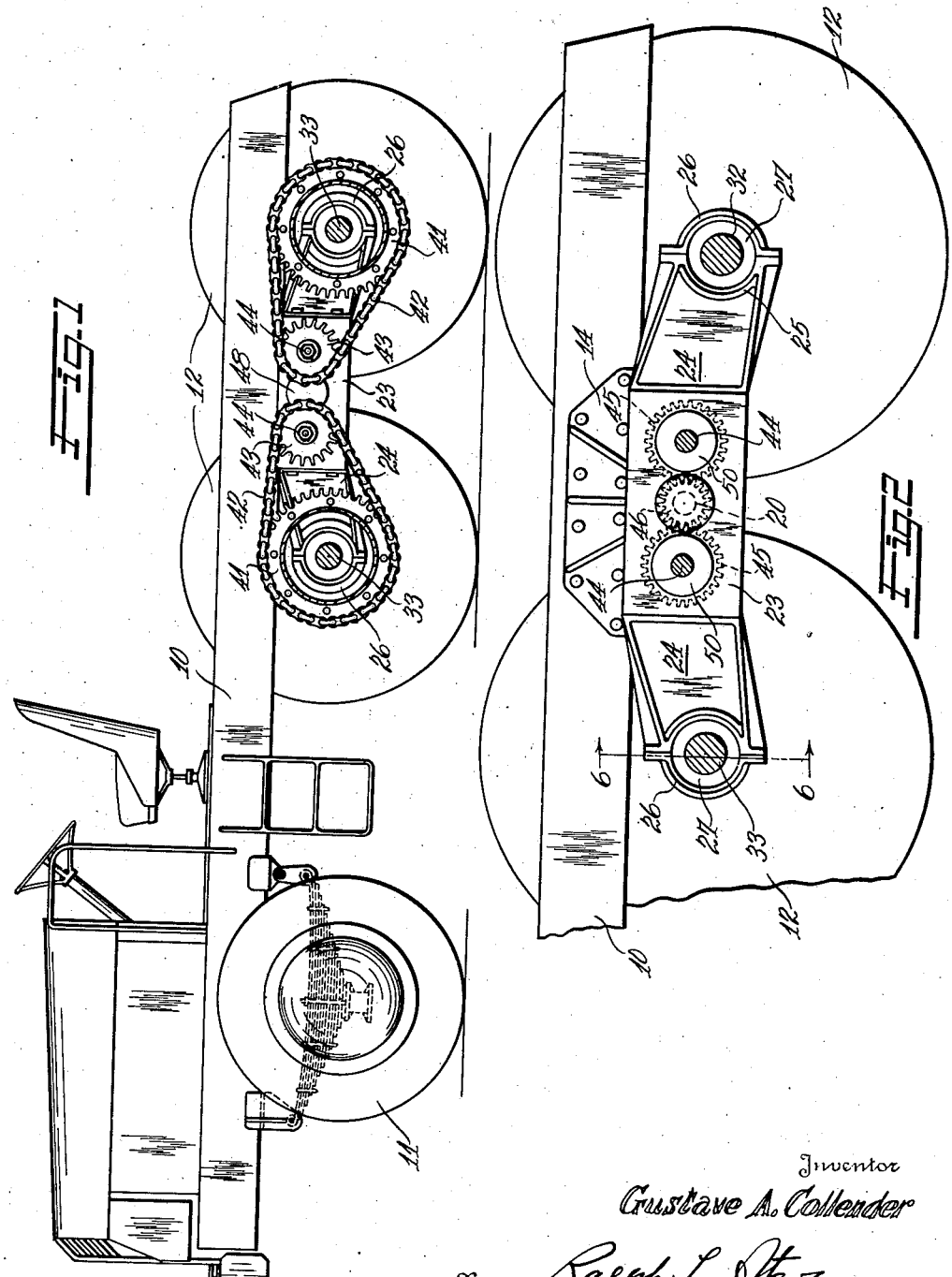

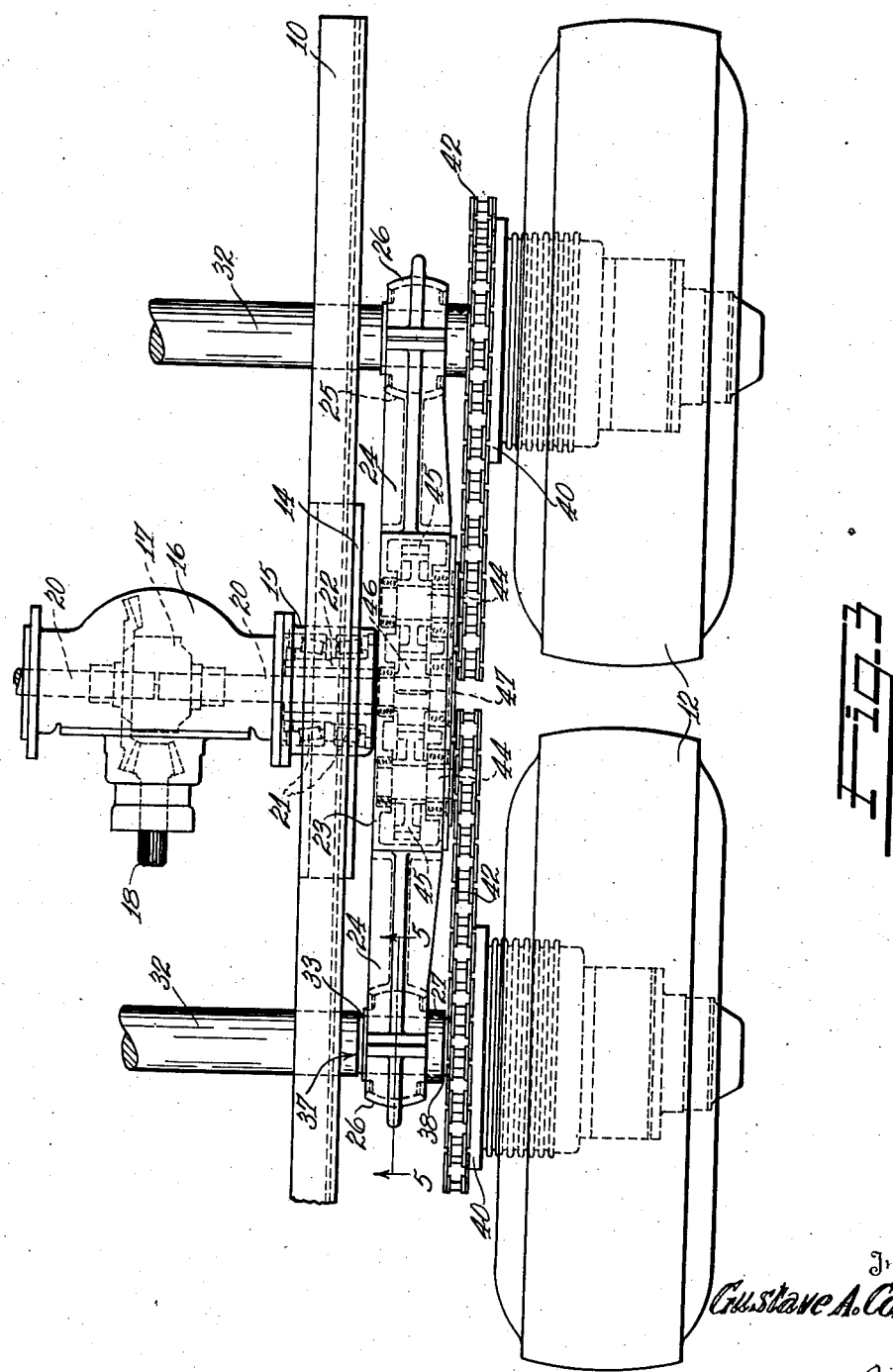

2,319,978

UNITED STATES PATENT OFFICE 2,319,978

ROAD VEHICLE MOUNTING

Gustave A. Collender, Los Angeles, Calif.

Application September 30, 1940, Serial No. 359,127

2 Claims. (Cl. 280—80)

The present invention relates to multiwheel vehicles of the type embodying six or more wheels and designed to travel over rough terrain as well as over normal roadways. The invention is particularly concerned with the construction of a truck or carriage for artillery, such as 75 mm. anti-aircraft guns, for example.

In present types of vehicle gun mountings, stabilizer jacks are necessary to maintain the gun platforms in sufficiently stable condition to afford fairly accurate firing while the vehicle is in motion. The need for such jacks is eliminated by the present invention, which provides an undercarriage that automatically maintains the gun mountings substantially level in spite of uneven roads or other irregular traction surfaces.

My invention further is concerned with a multiwheel vehicle that can carry heavy loads with effective and sufficient traction in the operations of excavating, mining and logging. Such operations normally are carried out without adequate road facilities for transportation of materials to be conveyed.

In the preferred form of my invention, the usual springs are eliminated and a tandem axle suspension is provided in which rigid beams are pivoted between their ends and connected at their ends to the axles by four joints which are universal in action and yet which prevent rotation of the axles. It is the primary object of the present invention to devise a practical unit of this type, particularly where the wheels are driven.

It is a major object of my invention to provide new and improved means for connecting the ends of a pair of rigid equalizing or walking beams to the ends of a pair of full transverse tandem axles in such manner that the axles may swing and tilt freely under any and all conditions while being held against rotation. This object contemplates the use of either rigid or yieldable torque-resisting connections, and in either case there are subordinate objects dealing with improvements in the particular joint, as will be seen from the following disclosure.

One of the subordinate objects, in particular, where rigid joints are employed, resides in the provision of sleeve elements arranged between the axles and the beam ends in such fashion that certain interlocking actions and sliding movements taken place to permit any one or more wheels to rise and fall freely and independently of the others and to assume its proper share of the load.

The foregoing and other important objects of my invention should clearly appear from a careful study of the following detailed description when taken in conjunction with the accompanying drawings and the appended claims. In the drawings:

Fig. 1 is a side elevational view of a vehicle incorporating a preferred embodiment of the invention, with the wheels on the visible side cut away for clarity of illustration.

Fig. 2 is an enlarged fragmentary showing of the rear end of the vehicle, with the wheels and their chain and sprocket driving mechanism cut away in vertical section.

Fig. 3 is a plan view of one side of the rear end of the vehicle and of the differential unit, it being understood that the other side is identical.

Fig. 4 is a rear end view of the vehicle, with the beam connections shown in section.

Fig. 5 is a sectional detail view taken on the plane of line 5—5 in Fig. 3.

Fig. 6 is another sectional view taken on the plane of line 6—6 in Fig. 2.

Fig. 7 is a view corresponding to Fig. 6 but showing a modified form of universal connection between the beam end and the axle.

With continued reference to the drawings, wherein like numerals are employed to designate like parts, the illustrated vehicle comprises a framework including a pair of sturdy side channel members 10, supported at their front ends by the usual dirigible wheels 11 and at their rear ends by tandem sets of wheels 12. The longitudinal members 10 are joined by cross members, such as that seen at 13, Fig. 4. It is understood, of course, that the sets of wheels 12 need not have a particular location longitudinally of the framework and that they may be duplicated under certain conditions where a longer framework is utilized. The invention resides primarily in the manner in which these wheels 12 support the chassis and in the manner in which they are driven.

A bracket 14 is riveted, bolted or otherwise secured to the side of each channel member 10, and these brackets have integral downwardly offset sleeves 15 that are aligned transversely of the vehicle. Between these sleeves and bolted or otherwise secured thereto is disposed an axle bowl 16 containing a conventional differential unit 17 that is driven by a pinion 18 in usual manner from the vehicle power plant (Fig. 3). A pair of differentially driven axle shafts 20 extend from the unit 17 outwardly through and beyond the sleeves 15 in full floating manner to drive the wheels 12 through mechanism yet to be described.

Each sleeve 15 contains a pair of roller bearing assemblies 21 which serve as a pivotal mounting for a trunnion quill 22 that is integral with or rigidly attached to the inner side of a walking beam center section in the form of a longitudinally arranged gear casing 23 into which projects the outer end of one of the axle shafts 20, and to the ends of this center section are bolted or otherwise secured a pair of rigid solid extensions 24. Each beam thus consists essentially of three aligned parts. The free ends of the extensions 24 terminate in semi-sleeves 25 that have spherically curved inner surfaces and to these sleeves are secured complemental end caps 26—each set of parts 25 and 26 serving to form a complete sleeve of internally spherical curvature.

Housed within each sleeve thus formed is a cylindrical sleeve 27 having an integral ball-shaped portion 28 that is adapted for free universal action within the spherically curved seat formed by the outer sleeve. Cut transversely through the seat just mentioned is a slot 30 that has flat sides and a spherically curved bottom (Figs. 5 and 6). This slot, in cooperation with a key 31 carried by the ball 28 is designed to prevent appreciable relative rotation of the interlocked parts. The slot is slightly wider than the key for a purpose later explained, and the bottom of the key is spherically curved so as not to interfere with the remaining universal action.

The multiwheel unit at the rear includes two full transverse idle axles 32 which have reduced end portions 33 that extend slidably through the sleeves 27 and rotatably support the wheels 12. As the wheels and axles carry cooperating brake mechanisms in usual manner, the axle ends have keyways 34 for reception of keys 35 that are interlocked with the sleeves 27 to transmit braking torque from the axles to the walking beams by way of the larger keys 31. Although all four sleeves 27 slide onto the axle ends 33 during assembly, two of them—at diagonally opposite corners of the suspension—can partake of no sliding movement during operation because they are confined rather closely between the wheel brake units and the shoulders which mark the point of axle enlargement. At the other two diagonally opposite corners of the suspension, however, clearances 37 and 38 are provided (Figs. 3, 4 and 6) so that sufficient relative sliding movement may take place to permit the axles 32 to tilt freely during operation. This is essential because the two beams are rigid and always swing in parallel planes.

The provision of clearances 37 and 38 at only one end of each axle ensures that the vehicle framework shall not shift bodily sideways relative to the undercarriage. The keys 31 assist in preventing sidesway because their curved surfaces prevent any purely lateral or lineal movement of the beam ends 25 relative to the balls 28. The purpose of the slight clearances in the slots 30 adjacent the sides of the keys 31 (Fig. 5) is to permit a very slight oscillation of either end of each axle in response to swinging and tilting movements thereof. In the absence of such an arrangement there would be a tendency to twist the axles at times and thus damage the joints due to the non-yielding character of the suspension beams. However, it is necessary to provide such clearance for only one key 31 of each axle, and this practice is preferable because it affords stronger and more positive torque transmission means for braking reactions.

Thus, a multiwheel unit is provided embodying full transverse axles and rigid walking beams, with no yielding or resilient material anywhere between the axles and the chassis frame, and yet which is capable of traveling at high speed over uneven terrain with complete flexibility of the axles, universal action in the joints and transmission of braking torque to the frame. Of important notice is the fact that in spite of the full universal action, torque reactions are transmitted from the axles to all four ends of the two walking beams.

The brake drums 40 of the wheels 12 have sprocket rims 41 secured thereto and driven by roller link chains 42 that pass around sprocket wheels 43 which are disposed just outside the center sections 23 of the walking beams. These wheels 43 are secured to transverse shafts 44 which extend into the casing sections 23 for splined or keyed interconnection with gears 45, which are straddle mounted in the casings by suitable bearings as shown in Fig. 3. Each pair of gears 45 is in mesh with a primary gear 46 that is keyed at 47 upon the outer or floating end of one of the axle shafts 20, it likewise being straddle mounted in the casing by suitable bearings. A cap 48 (Fig. 1) serves as a closure and retainer for one of the bearings, and further caps or plates 50 (Fig. 2) are secured to the casing section adjacent the outer bearings for the shafts 44.

In operation, the differentially driven shafts 20 actuate the gears 46 each of which in turn drives both of its associated gears 45, the latter thus rotating in opposite directions to actuate the chain and sprocket mechanisms so that the wheels 12 will rotate in unison in the same direction. The chains are not much exposed to damage from projectiles and flying fragments of warfare, but should one become broken or should one at each side be broken the vehicle will continue to operate. Should both chains at one side be removed, emergency operation still can be obtained by interlocking the exposed sprocket wheels 43 with a broken piece of chain or by a block or in other suitable manner, and then the wheels at the other side will drive the vehicle. The use of chains has the advantage that they can be repaired quickly and easily by a mechanic if a few spare links are carried in the tool box. Given proper attention, chains are noiseless and will withstand high speed operation for prolonged periods.

As aforestated, although the suspension embodies no springs and consists in itself of nothing more than a trunnion pivot and a pair of gear box extensions which connect with the wheel axles, the axle ends swing and tilt freely without tilting the vehicle framework appreciably and without damage to any of the parts.

In the modification seen in Fig. 7, the hard ball 28 is eliminated in favor of resilient means such as rubber, which adds a desirable cushioning effect for absorption of road shocks and which to some extent has several advantages over an all-metal joint. In this form, the ends 250 (corresponding to part 25 of Fig. 5) have interior surfaces that are cylindrical except for a plurality of inwardly offset lugs 52; and the sleeve 27 has, in lieu of the ball 28, a plurality of radially extended lugs 51. The interior surface of the end cap 26—not seen in Fig. 7—will of course correspond to that of the end 250. A rubber ring 53 is interposed between the two metal sleeves with appropriate recesses for close reception of the lugs 51 and 52, and preferably the rubber is bonded to the surfaces which it engages. The key 31 of course is omitted.

The rubber rings 53 are tapered outwardly in section, as shown, sufficiently to afford maximum flexibility and cushioning action without permitting undesirable sidesway of the frame and walking beams relative to the wheels. By increasing the diameter of the rubber rings and their encircling metal sleeves without increasing the diameter of the internal metal sleeves, sufficient lateral yield or "give" can be imparted by deformation to the tapered rings to permit elimination of the clearances 37 and 38 at all four corners of the suspension. In fact, this would permit elimination of the internal metal sleeves and their keys 35 entirely, the lugs 51 then being formed upon the axle ends 33 or some other suitable means being provided for directly interlocking the axle ends and the rubber rings.

It is to be understood that the invention is not restricted to the illustrated details of the disclosed embodiments, and that various changes may be made without departing from the spirit of the invention as set forth in the appended claims.

What is claimed is:

1. In combination with a vehicle framework associated with tandem sets of wheels that support a pair of full transverse axles, a pair of substantially rigid walking beams pivotally connected between their ends to the respective sides of the framework in such manner as to swing in parallel paths, and universal joints connecting the ends of said beams to the adjacent ends of said axles, said joints consisting entirely of metal parts and each comprising an internally cylindrical sleeve surrounding and keyed to its corresponding axle end and also keyed to its corresponding beam end, said sleeve and said beam end having complemental ball-shaped surfaces, and one of the keying means likewise being of spherical curvature so as to resist torque reactions without interfering with free tilting movement of the associated axle.

2. In the combination defined in claim 1, the spherically curved keying means comprising at least one key having flat side surfaces and further comprising a fully complemental recess in its corresponding sleeve for reception of said key, and a keyway in said beam end that is slightly wider, circumferentially of the axle, than the key.

GUSTAVE A. COLLENDER.